US011279303B2

(12) United States Patent
Lisseman et al.

(10) Patent No.: US 11,279,303 B2
(45) Date of Patent: Mar. 22, 2022

(54) SYSTEM AND METHOD FOR DETECTING MOVEMENT OF AN OCCUPANT SEATED IN A VEHICLE

(71) Applicant: Joyson Safety Systems Acquisition LLC, Auburn Hills, MI (US)

(72) Inventors: Jason Lisseman, Shelby Township, MI (US); Len Cech, Auburn Hills, MI (US)

(73) Assignee: Joyson Safely Systems Acquisition LLC, Auburn Hills, MI (US)

( * ) Notice: Subject to any disclaimer, the term of this patent is extended or adjusted under 35 U.S.C. 154(b) by 150 days.

(21) Appl. No.: 16/735,466

(22) Filed: Jan. 6, 2020

(65) Prior Publication Data

US 2020/0216000 A1     Jul. 9, 2020

Related U.S. Application Data

(63) Continuation of application No. 15/643,379, filed on Jul. 6, 2017, now Pat. No. 10,525,910.

(51) Int. Cl.
| | |
|---|---|
| *B60R 16/023* | (2006.01) |
| *B60R 16/027* | (2006.01) |
| *B62D 1/04* | (2006.01) |
| *G05D 1/00* | (2006.01) |
| *G05D 1/02* | (2020.01) |
| *B60K 28/02* | (2006.01) |

(52) U.S. Cl.
CPC .......... *B60R 16/0231* (2013.01); *B60K 28/02* (2013.01); *B60R 16/027* (2013.01); *B62D 1/046* (2013.01); *G05D 1/0061* (2013.01); *G05D 1/021* (2013.01)

(58) Field of Classification Search
CPC ... B60R 16/0231; B60R 16/027; B60K 28/02; B62D 1/046; G05D 1/021; G05D 1/0061; B60W 2540/01; B60W 50/082; B60W 50/12
See application file for complete search history.

(56) References Cited

U.S. PATENT DOCUMENTS

| | | | |
|---|---|---|---|
| 5,775,456 A | * | 7/1998 | Reppas .................. B60K 26/02 180/271 |
| 7,421,621 B1 | | 9/2008 | Zambrana |
| 7,453,444 B2 | | 11/2008 | Geaghan |
| 9,290,177 B2 | | 3/2016 | Endo |

(Continued)

OTHER PUBLICATIONS

International Search Report and Written Opinion issued in International No. PCT/US2018/040878; filed Jul. 5, 2018.

*Primary Examiner* — Michael J Zanelli
(74) *Attorney, Agent, or Firm* — Gordon Rees Scully Mansukhani, LLP

(57) ABSTRACT

A system for detecting a motion of an occupant seated in a vehicle. The system includes a sensing electrode located proximate to the occupant and configured to transmit a signal representative of a current in the sensing electrode. The system also includes a receiver including a controller and coupled to an antenna. The receiver is configured to detect a change in the transmitted signal based on a presence of the occupant and a set detection condition, and generate detection information based on the set detection condition. The controller is configured to change a state of a vehicle component based on the generated detection information.

14 Claims, 3 Drawing Sheets

(56) References Cited

U.S. PATENT DOCUMENTS

| | | |
|---|---|---|
| 2009/0082951 A1 | 3/2009 | Graessley |
| 2011/0224897 A1 | 9/2011 | Tan |
| 2012/0088446 A1 | 4/2012 | Fyke |
| 2014/0151356 A1 | 6/2014 | Maguire et al. |
| 2015/0253753 A1 | 9/2015 | Bennett et al. |
| 2017/0057542 A1 | 3/2017 | Kim et al. |
| 2017/0322552 A1* | 11/2017 | Hilnbrand ............. B60W 50/08 |
| 2017/0353597 A1* | 12/2017 | Wolterman ............. H04W 4/48 |
| 2018/0370543 A1 | 12/2018 | Poeppel |

* cited by examiner

SYSTEM AND METHOD FOR DETECTING MOVEMENT OF AN OCCUPANT SEATED IN A VEHICLE

BACKGROUND

The present application relates generally to the field of capacitive sensing and proximity detection systems.

In-vehicle detection systems use various technologies to detect a presence of an occupant in a vehicle and movement of the occupant in the vehicle. Currently camera based detection methodology is utilized to identify an occupant who is interacting with a device in a vehicle.

However, there remains a need for an in-vehicle detection system with increased capabilities to detect the movement of the occupant and change a state of a component of a control module of a vehicle based on the detected movement of the occupant. It is of particular importance to determine the type of occupant (e.g. a driver or a passenger) that is interacting with the component of the control module of the vehicle. In addition, there is a need to redirect the occupant to a safer method (e.g., voice operation) of interacting with the component of the control module of the vehicle when the vehicle is in a manual driving mode.

BRIEF DESCRIPTION OF THE DRAWINGS

These and other features, aspects, and advantages of the present invention become apparent from the following description and the accompanying exemplary embodiments shown in the drawings, which are briefly described below.

DETAILED DESCRIPTION

Several methods and systems are proposed to determine whether an occupant seated in a vehicle seat may control a component of a control module of a vehicle.

According to one embodiment, a capacitive sensing system and the body of the occupant as a conductive conduit and a capacitive proximity detection system and a receiver thereof are used to detect movement of the occupant in the vehicle seat to change a state of the component of the vehicle. Thus the overall capacitive system comprises a modified steering wheel integrated capacitive sensing system for detecting a presence of the occupant and a capacitive proximity detection system for detecting movement of the occupant when seated in the vehicle seat.

Figure 1:
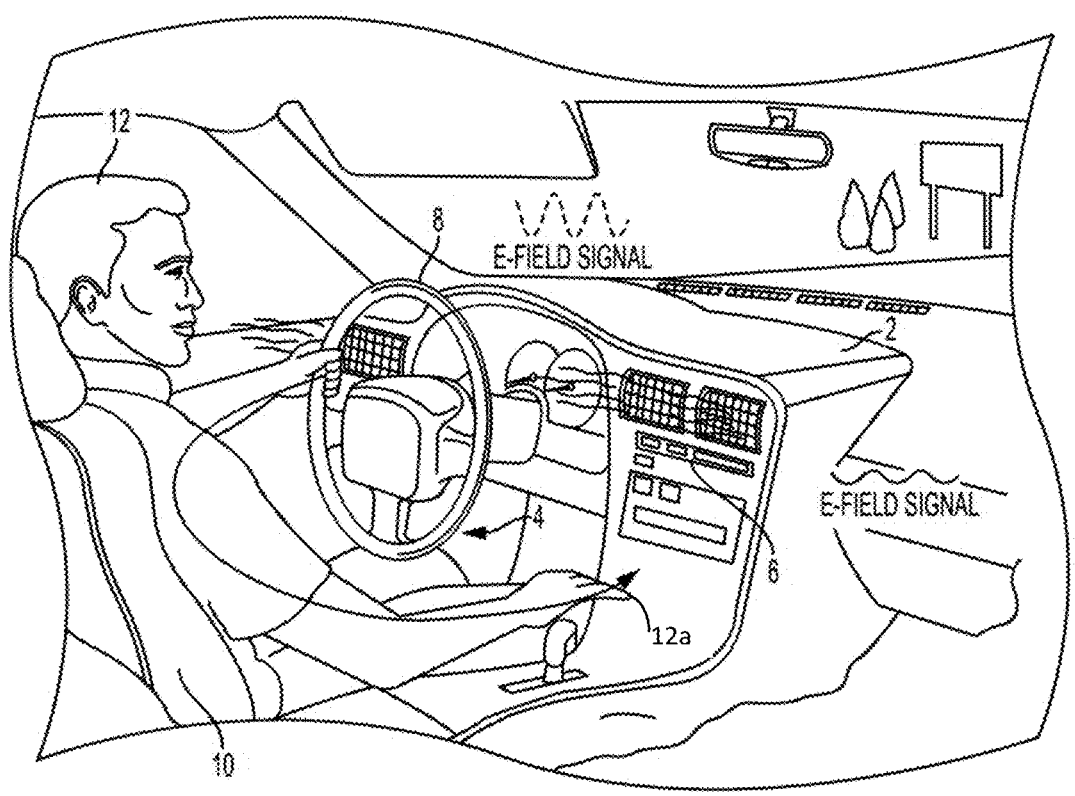
FIG. 1 is a schematic side view of an occupant in a vehicle seat including a capacitive sensing and proximity detection system.

As shown in FIG. 1, a capacitive sensing system may include a sensing electrode 4 located in a vehicle steering wheel 8. The sensing electrode 4 is connected to electronics located in a control module 2. The electronics includes a signal generator that provides a voltage signal to the sensing electrode 4. The voltage signal may be sinusoidal or other suitable profile. Due to the applied voltage, a current flows in the sensing electrode 4. The current in the electrode creates a corresponding electrical field in the vicinity of the sensing electrode 4. The interaction between surrounding objects and the electric field changes the effective impedance of the sensing electrode 4. For example, the current in the sensing electrode 4 can change due to the presence of objects in the vicinity of the electric field (e.g., a hand of an occupant 12 on the steering wheel 8).

As shown in FIG. 1, the electric signal provided to the sensing electrode 4 generates an electric field that may cause a corresponding current to flow through the occupant 12 to the receiver 6. The control module 2 may adjust the power level of the voltage signal transmitted to the sensing electrode 4 (and the power of the corresponding transmitted electric field) based on an estimated impedance of the occupant 12. The system includes electronics that can measure the resultant electric field signal transfer or coupling as a change in amplitude and phase based on the strength of the coupling through the body.

Figure 2:
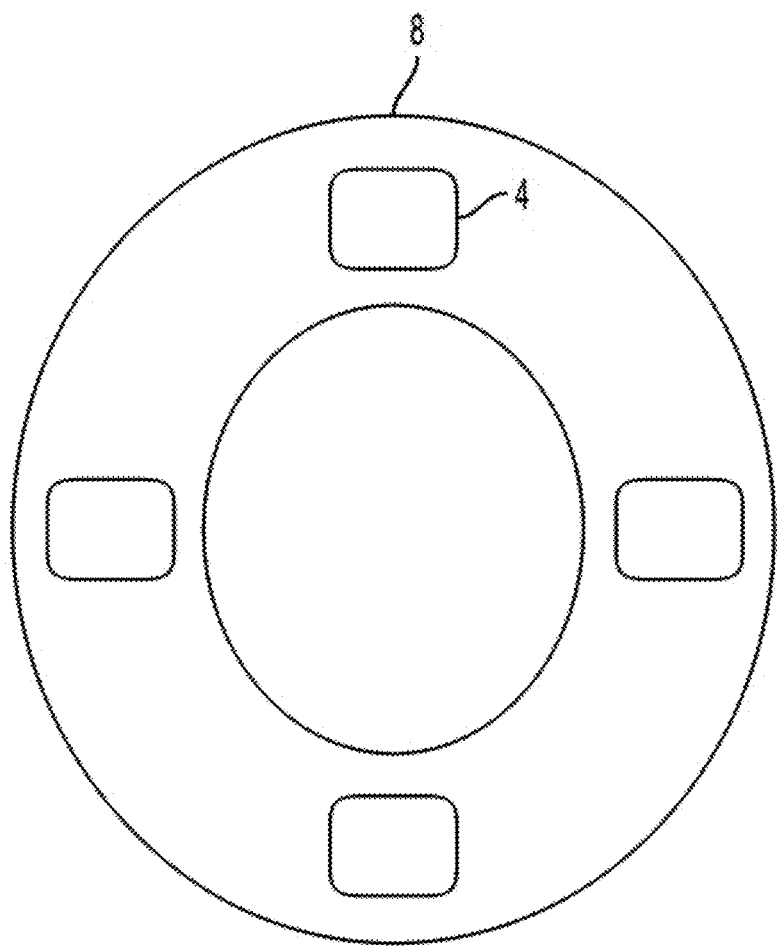
FIG. 2 is a schematic of a steering wheel including a sensing electrode.

FIG. 2 is a schematic of a steering wheel including a sensing electrode. The steering wheel 8 may include at least one sensing electrode 4. The steering wheel 8 may be oval, square, rectangular or circular in shape and the configuration of the at least one sensing electrode 4 therein may be symmetric or asymmetric.

The capacitive sensing system is used in conjunction with the capacitive detection system. As shown in FIG. 1 the capacitive detection system includes a receiver 6 to detect the transmitted electric field signal through the body of the occupant 12. The electric field signal may be transmitted through the occupant over one of a discrete frequency and a time phase frequency. The receiver 6 includes a controller and may be located in the control module 2. The receiver 6 may also be located in a terminal device in the vehicle including but not limited to a mobile phone, a tablet, a laptop, a camera, a wearable electromechanical device, a camcorder, a radar detector and an independent navigation unit. The receiver 6 is coupled to or includes an antenna and is configured to detect the transmitted electric field signal carried through the occupant. The receiver 6 is configured to detect the transmitted signal and the corresponding presence of the occupant based on detected signal information indicating a proximity or contact between an appendage 12a of the occupant 12 and the antenna.

The antenna may be configured in an appropriate shape for enhancing sensitivity to the signal being carried by the occupant and may be integrated into other components of the vehicle (e.g., display, instrument panel, etc.). For example, the antenna may be one of a rectangular and oval shape. The antenna may be incorporated within the receiver 6 or may be coupled to the receiver 6. The receiver 6 is configured to detect a change in the transmitted electric field signal from the sensing electrode 4 due to the applied voltage to the sensing electrode 4 and contact between the occupant 12 and the steering wheel 8.

Figure 3:
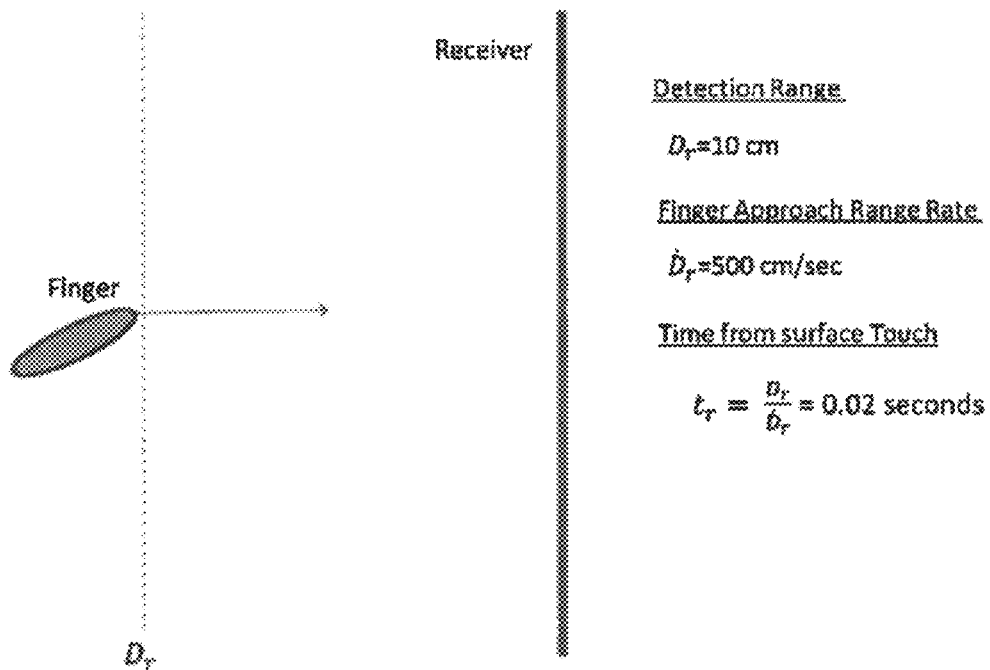
FIG. 3 is a schematic of proximity detection of an appendage of the occupant.

As shown in FIG. 3, the receiver 6 is also configured to detect a change in the transmitted electric field signal based on an analysis of the detected signal. The analysis results in a determination of a detection condition by the receiver 6 or controller. For example, the detection condition may determine that the occupant is touching (or not touching) and attempting to operate a component of the vehicle. The detection condition may be determined using at least one of a size of the occupant's appendage 12a, an approaching rate of speed of the occupant's appendage 12a to the receiver 6, a withdrawal rate of speed of the occupant's appendage 12a from the receiver and a detection range between the occupant's appendage 12a and the receiver 6. The occupant's appendage 12a may be but is not limited to any one of a hand, finger, foot and toe and the detection range may be a predetermined distance between the occupant's appendage 12a and the receiver 6.

In one embodiment, the detection condition is determined according to the approaching rate of speed $D_r$ of the occupant's appendage 12a (e.g., finger) and a detection range $D_r$ between the occupant's appendage 12a and the receiver 6. For example, as shown in FIG. 3, the approaching rate of speed $D_r$ of the occupant's appendage 12a is 500 cm/sec and the detection range $D_r$ is 10 cm.

The receiver 6 is also configured to generate detection information based on the signal received at the antenna. The detection information may indicate a proximity between the occupant's appendage 12a and the receiver 6. For example, and as shown in FIG. 3, when the approaching rate of speed $D_r$ of the occupant's appendage 12a is 500 cm/sec and the detection range $D_r$ is 10 cm, the receiver 6 calculates as the detection information, a time from a surface touch $t_r$ of the receiver 6 by the occupant's appendage 12a. In the above example, the receiver calculates the time from a surface touch $t_r$ as 0.02 seconds. Accordingly, the detection information may be but is not limited to the time from the surface touch $t_r$ of the receiver 6 by the occupant's appendage 12a.

According to one exemplary embodiment, the receiver 6 provides the generated detection information to the controller which is configured to determine whether the occupant 12 may control the component of the control module of the vehicle based on a driving mode of the vehicle (e.g., autonomous or manual) and contact between the occupant 12 and the steering wheel 8. In another embodiment, the receiver is configured to use the detection information to determine the detection condition and simply transmits information to the controller indicating whether a detection condition exists (e.g., contact or no contact). In the case where the receiver is not located proximate to the controller (e.g., connected via a direct conductor), the data and information provided to the controller from the receiver may be transferred wirelessly such as, for example, via blue tooth connection between a wearable electronic device housing the receiver and the controller located in the instrument panel of the vehicle.

In one embodiment the controller prohibits, based on the determination, the occupant 12 from controlling the component by disabling touched based control of the component when the vehicle is in a manual driving mode and the occupant 12 is in contact with the steering wheel 8. Further, the controller generates a prompt indicating the touched based control of the component is disabled. For example, if the occupant 12 is a driver of the vehicle and attempts to use the navigation system to search a new destination while driving on a congested freeway, the system transmits the electric field signal from the steering wheel 8 through the hand of the driver to be detected by the receiver 6 surrounding the navigation system. Upon detection of the transmitted electric field signal the controller, being configured with a protocol that the navigation system should be disabled for the driver, generates a voice prompt indicating the touch based control of the navigation system is disabled. The system for controlling the component can be extended to terminal devices including but not limited to a cellphone, a wearable electronic or electromechanical device, a tablet, a laptop, a camera, a camcorder, a radar detector and an independent navigation unit.

In another embodiment, wherein the occupant 12 is a driver of the vehicle, the controller allows the driver to control the component when the vehicle is in one of a semi autonomous driving mode and an autonomous driving mode and the driver is other than in contact with the steering wheel 8. Therefore, when the system determines the vehicle is in one of a semi autonomous driving mode and an autonomous driving mode contact between the driver and the steering wheel 8 may not be necessary thereby providing a natural bypass to the system.

In another embodiment, wherein the occupant 12 is a passenger of the vehicle, the controller allows the passenger to control the component when the vehicle is in a manual driving mode and the passenger is other than in contact with the steering wheel 8. For example, if the occupant 12 is a passenger of the vehicle and attempts to use a navigation system of the vehicle to search a new destination while the driver is driving on a congested freeway, the system allows the passenger to control the navigation system knowing that the passenger is other than in contact with the steering wheel 8.

In yet another embodiment, wherein the occupant 12 is a passenger of the vehicle, the controller allows the passenger to control the component when the vehicle is in one of a semi autonomous driving mode and an autonomous driving mode and the passenger is other than in contact with the steering wheel 8.

In another embodiment the system may be configured such that the sensing electrode 4 is located within the control module 2 and is configured to transmit the electric field signal representative of the current in the electrode 4 through the occupant 12 of the vehicle via a body area network.

Further, the receiver 6 may be may be located in the steering wheel 8 of the vehicle and is configured to detect the transmitted electric field signal based on contact between the occupant 12 and the steering wheel 8. In addition, the receiver 6 may be located in a seat 10 of the vehicle or a seat mat of the vehicle such that the system is aware the occupant 12 is in contact with the seat 10 or the seat mat.

Specifically, the controller is configured to determine whether the occupant may control the component based on a driving mode of the vehicle and the contact between the occupant 12 and the steering wheel 8. For example, the may controller prohibit, based on the determination of the occupant's position, the occupant 12 from controlling the component by disabling touched based control of the component when the vehicle is in a manual driving mode and the occupant 12 is in contact with the steering wheel 8. The controller may be configured to generate a prompt (audio and/or visual) indicating the touched based control of the component is disabled.

In another embodiment the system could operate concurrently with a second controller that independently controls an operation of the vehicle (e.g. speed settings or lane changes). Specifically, if coupled with the system and when the vehicle is in one of a semi autonomous driving mode and an autonomous driving mode, the second controller would allow for a passenger of the vehicle to take limited control of the vehicle when contact between the driver and the steering wheel 8 may not be necessary. For example, in an emergency situation if the driver became incapacitated the second controller would allow for the passenger to take control of the vehicle to safely slow down and stop the vehicle.

Figure 4:
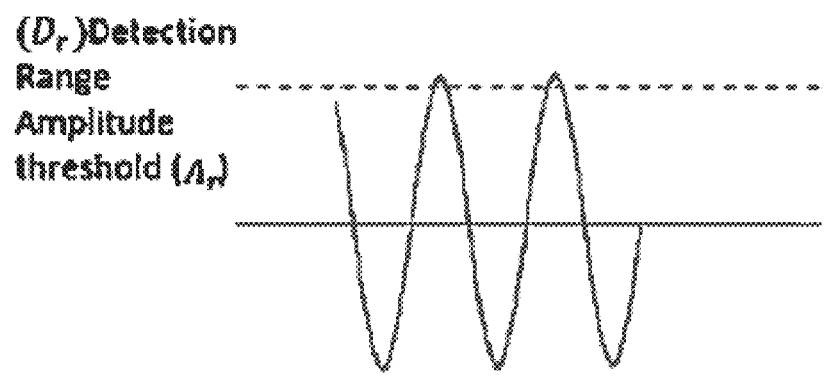
FIG. 4 is a graph of proximity detection according to a detection range and an amplitude threshold.

In another embodiment, as shown in FIG. 4, the detection condition is determined by comparing the amplitude of the received electric field signal carried through the occupant to an amplitude threshold, which is based on an expected amplitude for a given detection range between the occupant's appendage 12a and the receiver 6.

Although specific shapes and locations of each element have been set forth in the drawings, each element may be of any other shape or location that facilitates the function to be performed by that element. In an exemplary embodiment, the sensing electrode 4 and receiver 6 have been shown in particular vehicle locations. However, in other exemplary embodiments the sensing electrode 4 and receiver 6 may be located in other parts of the vehicle. For example, the sensing electrode 4 may be located in a seat 10 of the vehicle or a seat mat of the vehicle.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to exemplary embodiments. However, persons skilled in the art will recognize that changes may be made in form and detail without departing from the spirit and scope of the disclosed subject matter. For example, although different exemplary embodiments may have been described as including one or more features providing one or more benefits, it is contemplated that the described features may be interchanged with one another or alternatively be combined with one another in the described exemplary embodiments or in other alternative embodiments. The technology of the present disclosure is relatively complex and thus not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the driver monitoring system may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the elements of the system as shown in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without material departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the exemplary embodiments without departing from the spirit of the present subject matter.

What is claimed is:

1. A system for controlling a component of a control module of a vehicle operated by a driver and configured for operation in semi-autonomous and autonomous driving modes, comprising:
    a first electrode located proximate to the driver of the vehicle and configured to transmit a control signal representative of a current in the first electrode through the driver of the vehicle via a body area network;
    a second electrode proximate to a passenger of the vehicle and configured to transmit a second control signal representative of a current in the second electrode through the passenger of the vehicle via a passenger body area network; and
    a receiver coupled to an antenna located proximate to the component, the receiver being configured to detect the transmitted control signals and determine the presence of the driver and passenger proximate to the component based on detection information indicating a proximity between an appendage of the driver and the antenna; wherein the determination of the presence of the driver and passenger is provided to a controller and
    wherein the controller is configured to determine whether the driver may control the component based on a driving mode of the vehicle;
    wherein the controller is configured to prohibit, based on the determination of whether the driver may control the component, the driver from controlling the component by disabling touched based control of the component when the vehicle is in a manual driving mode, and
    wherein the controller is configured to permit the driver to control the component when the vehicle is in one of the semi-autonomous driving mode and the autonomous driving mode; and wherein the controller is configured to permit the driver to control the component when the vehicle is in one of the semi-autonomous driving mode and the autonomous driving mode; and wherein the controller is configured to permit the passenger of the vehicle to control a second controller that independently controls an operation of the vehicle when the vehicle is in semi-autonomous and autonomous driving modes.

2. The system of claim 1, wherein the first and second electrodes are located in a seat of the vehicle.

3. The system of claim 1, wherein the first electrode is located in a steering wheel of the vehicle.

4. The system of claim 1, wherein the controller is configured to generate a prompt indicating the touched based control of the component is disabled.

5. The system of claim 1, wherein the first electrode transmits the control signal through the driver over one of a discrete frequency and a time phase frequency.

6. The system of claim 1, wherein the receiver is located in a center console of the vehicle.

7. The system of claim 1, wherein the receiver is located in a terminal device in the vehicle and the controller prohibits, based on the determination, the driver from controlling the terminal device by disabling touched based control of the terminal device when the vehicle is in a manual driving mode and the driver is in contact with a steering wheel, and generates a prompt indicating the touched based control of the terminal device is disabled.

8. The system of claim 7, wherein the terminal device is one of a mobile phone, a tablet, a wearable electromechanical device and a laptop.

9. The system of claim 1, wherein the receiver is located in a terminal device in the vehicle.

10. The system of claim 9, wherein the terminal device is one of a mobile phone, a tablet, a laptop, a camera, a wearable electromechanical device, a camcorder, a radar detector and an independent navigation unit.

11. The system of claim 1, wherein the receiver is located in an instrument panel of a vehicle.

12. A system for controlling a vehicle operated by a driver and configured for operation in semi-autonomous and autonomous driving modes, comprising:
  a first electrode located proximate to the driver and configured to transmit a control signal representative of a current in the first electrode through the driver of the vehicle via a body area network;
  a second electrode proximate to a passenger of the vehicle and configured to transmit a second control signal representative of a current in the second electrode through the passenger of the vehicle via a passenger body area network; wherein the system is configured to detect the presence of the passenger based on the transmitted second control signal; and
  a receiver coupled to an antenna located in a steering wheel of the vehicle, the receiver configured to detect the transmitted control signal based on contact between the driver and the steering wheel, wherein the receiver includes a first controller configured to determine whether the driver is in contact with the steering wheel;
  wherein a second controller is configured to control the operation of the vehicle when the vehicle is in one of the semi-autonomous driving mode and the autonomous driving mode and the driver is not in contact with the steering wheel; and
  wherein the second controller is configured to permit the passenger to control the second controller when the vehicle is in one of the semi-autonomous driving mode and the autonomous driving mode.

13. The system of claim 12, wherein the first electrode transmits the control signal through the driver over one of a discrete frequency and a time phase frequency.

14. The system of claim 12, wherein the second controller is configured to allow the passenger to slow down and stop the vehicle in an emergency situation.

* * * * *